(12) United States Patent
Babbar

(10) Patent No.: US 9,460,503 B2
(45) Date of Patent: Oct. 4, 2016

(54) AUTOMATED VIDEO TESTING USING QR CODES EMBEDDED IN A VIDEO STREAM

(71) Applicant: ARRIS Enterprises, Inc., Suwanee, GA (US)

(72) Inventor: Gautam Babbar, Philadelphia, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/611,463

(22) Filed: Feb. 2, 2015

(65) Prior Publication Data

US 2016/0225131 A1 Aug. 4, 2016

(51) Int. Cl.
*G06K 9/00* (2006.01)
*G06T 7/00* (2006.01)
*G06K 9/18* (2006.01)
*G06K 19/06* (2006.01)

(52) U.S. Cl.
CPC ......... *G06T 7/0004* (2013.01); *G06K 9/00711* (2013.01); *G06K 9/18* (2013.01); *G06K 19/06037* (2013.01); *G06K 19/06103* (2013.01); *G06K 19/06112* (2013.01)

(58) Field of Classification Search
CPC ........ H04N 7/004; H04N 7/025; H04N 7/08; H04N 7/147; H04N 21/8146
See application file for complete search history.

(56) References Cited

U.S. PATENT DOCUMENTS

| | | | |
|---|---|---|---|
| 8,324,909 B2 | 12/2012 | Oakes et al. | |
| 8,553,146 B2 | 10/2013 | Kennedy | |
| 8,640,957 B2 | 2/2014 | Yang et al. | |
| 8,730,327 B2 | 5/2014 | Villanueva et al. | |
| 8,752,758 B1 | 6/2014 | Klebe | |
| 8,848,061 B2 | 9/2014 | Kolarov | |
| 8,881,195 B2 | 11/2014 | Clements | |
| 8,885,050 B2 * | 11/2014 | Wang | H04N 17/004 348/180 |
| 2006/0269162 A1 * | 11/2006 | Chen | G06T 1/0028 382/286 |
| 2009/0238263 A1 * | 9/2009 | Jaggi | H04N 21/2187 375/240.2 |
| 2010/0155464 A1 | 6/2010 | Swayn et al. | |
| 2012/0054567 A1 | 3/2012 | Valakh et al. | |
| 2012/0162440 A1 * | 6/2012 | Wu | H04N 17/004 348/181 |
| 2012/0206648 A1 * | 8/2012 | Casagrande | H04N 21/8146 348/462 |
| 2013/0188504 A1 * | 7/2013 | Partee | H04H 60/32 370/252 |
| 2013/0298179 A1 * | 11/2013 | Baum | H04N 21/4122 725/133 |
| 2013/0347050 A1 | 12/2013 | Friel | |
| 2014/0002670 A1 * | 1/2014 | Kolarov | H04N 17/004 348/180 |
| 2014/0015923 A1 * | 1/2014 | Au | G06T 7/0002 348/43 |
| 2014/0270505 A1 * | 9/2014 | McCarthy | H04N 19/17 382/165 |
| 2015/0138307 A1 * | 5/2015 | Karimi-Cherkandi | H04N 17/004 348/14.12 |

\* cited by examiner

*Primary Examiner* — Gregory M Desire
(74) *Attorney, Agent, or Firm* — Thomas A. Ward

(57) ABSTRACT

A test system is provided for analyzing a video frame received from a device under test such as a video rendering device includes a video capture device, a matrix code reader and a video quality analyzer. The video capture device receives a video stream from a video rendering device that includes a plurality of video frames. At least one of the video frames includes a matrix code overlaid thereon. The matrix code encodes one or more test parameters specifying one or more quality tests that are to be performed on the video frame on which the matrix code is overlaid. The matrix code reader scans and decodes the matrix code. The video quality analyzer analyzes the quality of the video frame based on the one or more quality tests embodied in the matrix code and decoded by the matrix code decoding device.

15 Claims, 5 Drawing Sheets

AUTOMATED VIDEO TESTING USING QR CODES EMBEDDED IN A VIDEO STREAM

BACKGROUND

Quality control is an important phase in product manufacturing. In factories or manufacturing sites, finished or semi-finished products are often inspected to determine whether the products are produced to meet a set of production requirements. In one example, testing of video rendering devices (e.g., set-top boxes, video cards of computer devices, display cards of mobile phones, portable multimedia devices, video players of various video formats such DVD and Blu-ray players, digital video recorders, etc.) includes testing of the video output of the video devices. The main idea of such a final system level test is to verify that the video being displayed to the user is acceptable with no noticeable impairments while various operations are being performed on the video rendering device.

Typically, the testing of a video rendering device can be performed by connecting a display device (e.g., a monitor or a television) to a video rendering device under test, and test personnel can observe the output as shown on the display device. The test personnel decide if the video device passes or fails the test based on a subjective evaluation of the output shown on the display device. Among other problems, manual testing is time-consuming and subject to human error. For example, sometimes the test is too long such that the tester cannot reliably verify the test. In other cases the error may happen very rarely or is visible to some testers but not others.

SUMMARY

In accordance with one aspect of the disclosure, a test system is provided for analyzing a video frame received from a device under test such as a video rendering device. The test system includes a video capture device, a matrix code reader and a video quality analyzer. The video capture device receives a video stream from a video rendering device that includes a plurality of video frames. At least one of the video frames includes a matrix code overlaid thereon. The matrix code encodes one or more test parameters specifying one or more quality tests that are to be performed on the video frame on which the matrix code is overlaid. The matrix code reader scans and decodes the matrix code. The video quality analyzer analyzes the quality of the video frame based on the one or more quality tests embodied in the matrix code and decoded by the matrix code decoding device.

BRIEF DESCRIPTION OF THE DRAWINGS

FIG. 4 is a flowchart showing one example of a method for testing a video rendering device such as a set top box or the like.

DETAILED DESCRIPTION

As manual testing can be time consuming, prone to error and in some instances lacking accuracy, a video quality analysis tool may be implemented to support automated video process quality checking, As detailed below, automated testing is accomplished by overlaying test information on the frames of the video stream which will be run through the Device Under Test (DUT). During video verification a reader reads the test information and a quality analyzer tool performs the tests specified in the video stream frames and determines whether the frame has any anomalies. The quality analysis tool may provide a pass/fail decision for the video, an identification of the worst errors in the video, and/or frame by frame identification of the calculated quality measures.

In accordance with an aspect of one embodiment, the test information that is overlaid on the video frames may be encoded in a visible object such as a matrix code, which are sometimes also referred to as a two-dimensional bar code. Two commonly used matrix codes are Microsoft Tags (MS tags) and quick response (QR) codes. 2-D barcodes need not be described in detail herein, as such codes are well known to those of skill in the art. Generally, however, 2-D barcodes such as QR codes and MS tags may be described as bar codes that contain a matrix of data. In comparison to the older 1-D (UPC) barcodes that consist of a plurality of parallel lines, data is presented in a 2-D barcode as a multitude of arranged shapes, often squares (dots) or triangles, including a plurality of normalizing shapes, located within a bounding grid. Whereas the older UPC barcodes are read using a light beam, 2-D barcodes are digitally imaged and analyzed by a processor to extract the encoded information. 2-D barcodes offer significant read time and data storage improvements over the older UPC bar codes.

Matrix codes may be used in various embodiments to store data that is used to perform certain quality tests on the video stream. Such data may include, for example, a unique identifier of the video frame on which the matrix code is located, an identifier of each test to be performed, and various test parameters, which may specify, among other things, tests to be performed on the video signals, test duration, test resolution, and pass or fail limits of the specified tests. Using the test parameters, a video analyzer can test and validate the received video signals.

Figure 1:
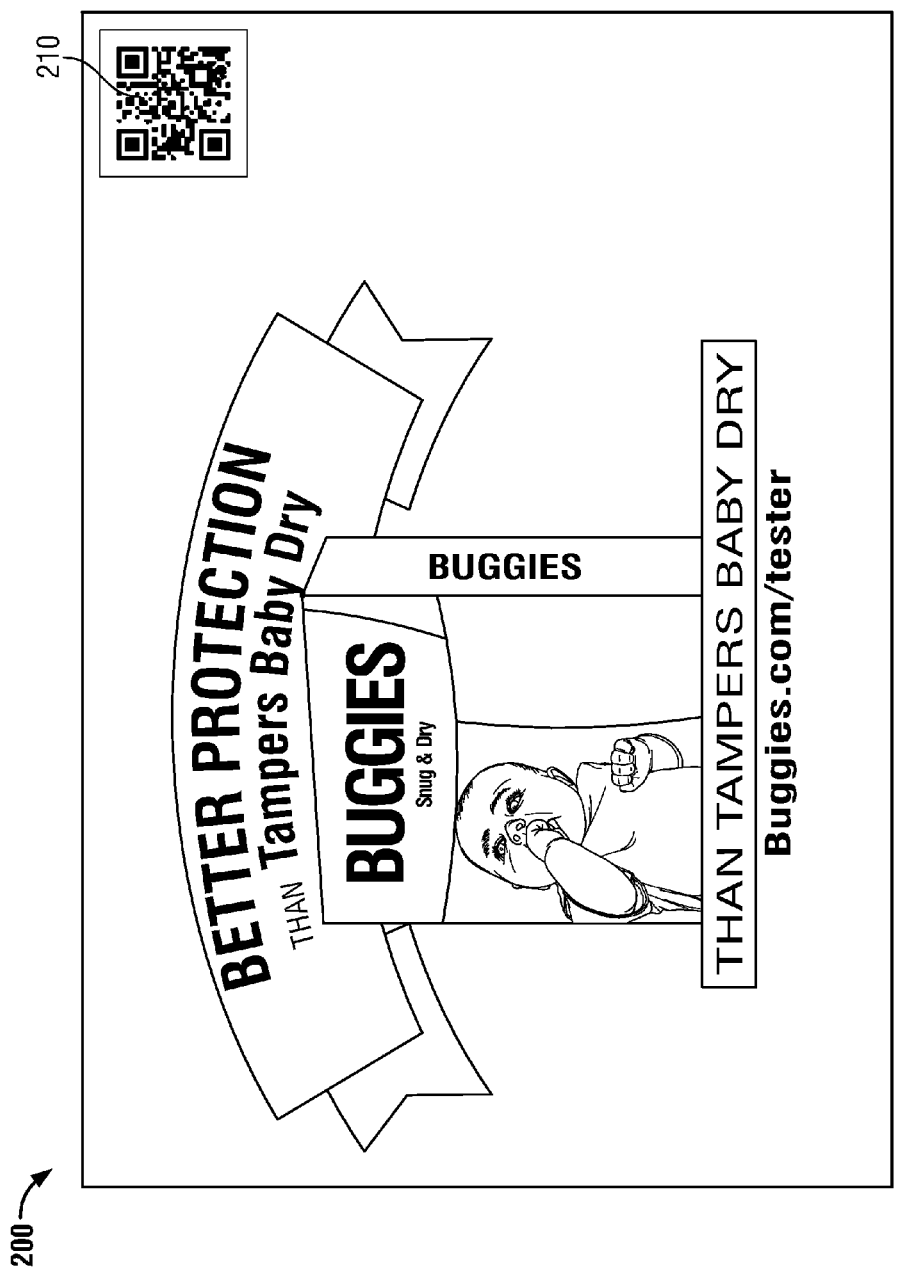
FIG. 1 shows an illustrative frame of video on which a matrix code has been inserted for the purpose of performing video quality tests.

A matrix code may be placed on every frame of the video stream or only on selected frames. FIG. 1 shows an illustrative frame 200 of video on which a matrix code 210 has been inserted. In some implementations the location of the matrix code in the frame is fixed and known to the test system. In other implementations the location of the matrix code 210 may vary (e.g., from frame to frame or from video segment to video segment), in which case the test system should be capable of locating the matrix codes within the frame.

When a matrix code is placed on every frame, the test(s) specified in the code is generally to be performed only on that frame. That is, the data specifies what test(s) is to be executed on the video frame and what is to be analyzed. A system that may be used to automate this process will be described below with reference to FIG. 2.

Figure 2:
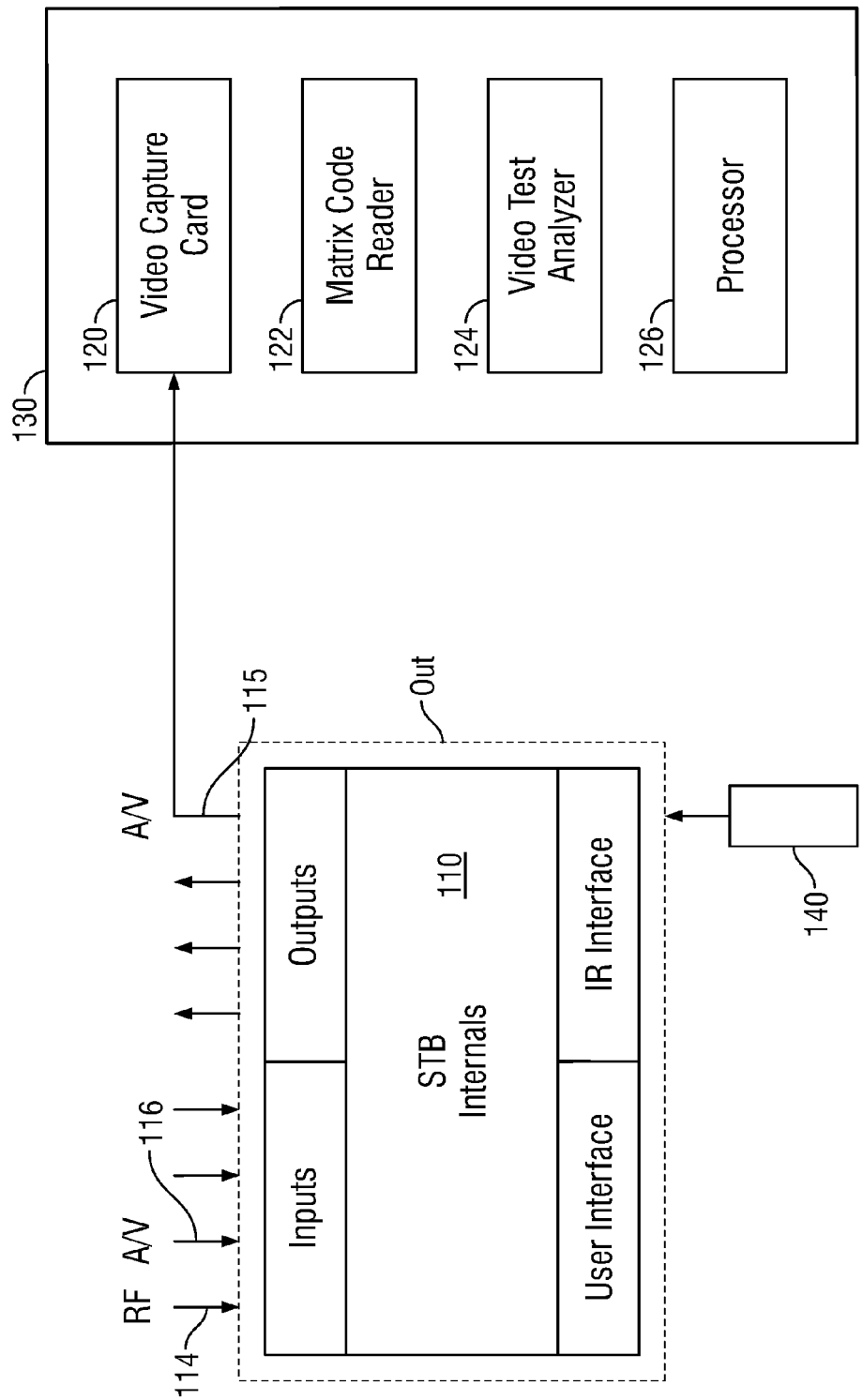
FIG. 2 shows one example of a video quality test system for testing the output video quality from a video rendering device.

One example of a video rendering device test system is shown in FIG. 2. In this example the DUT is illustrated as a being a set top box (STB). Of course, as previously mentioned, the DUT may be any type of video rendering device including, but not limited to, set-top boxes, video cards of computer devices, display cards of mobile phones, portable multimedia devices, video players of various video formats such DVD and Blu-ray players, digital video recorders and gaming devices.

The STB shown in FIG. 2 has a number of signal inputs including an RF signal 114, which may be, for example, from a satellite or cable connection. An A/V signal 116 may also be provided as input allowing the set-top box to feed through a signal to a television from a VCR, DVD, Blu-ray player, media juke box or other similar device. To allow the user to control the operation of the STB, a number of controls may be provided on the STB itself. Additionally, the STB 110 may have an infrared (IR) or wireless remote control input configured to operate with a remote control device 140. The output to a display, or in this case to test system 130, is an A/V signal 115 which may be provided over a variety of standard video interface connections. In some implementations, the video connection can be made using one or more physical cables or some other physical connection. Depending on the type of DUT, the number, types, and formats of signals, the cables may include a variety of standard configurations, including but not limited to: video component cables, Bayonet Neill Concelman (BNC) connectors, coaxial cables, Video Graphics Array (VGA) connectors, RCA connectors, Sony/Philips Digital Interface (S/PDIF), Universal Serial Bus (USB), FireWire, Ethernet cables, RJ45 connectors, phone jacks, Digital Video Interface (DVI), High-Definition Multimedia Interface (HDMI), etc. In some other implementations, the video connection can be made over a wireless medium in whole or in part; the video signal can be transmitted or broadcast over the air, for example.

The illustrative video quality test system 130 includes an input interface for receiving the video and possibly audio signals from the STB 110. This input interface may include a frame grabber or video capture card 120 or similar device for accepting the video frames from the STB 110. The data captured is then made available to a matrix code reader 122, which scans or otherwise reads and decodes the matrix code. The video frames and the decoded data associated with the video frames are then forwarded to a video test analyzer 124, which performs the test(s) specified by the decoded data and compares the results to the pass/fail criteria included in the matrix code. The video capture card 120, matrix card reader 122, video test analyzer 124 all operate under the control of a processor 126.

Figure 3:
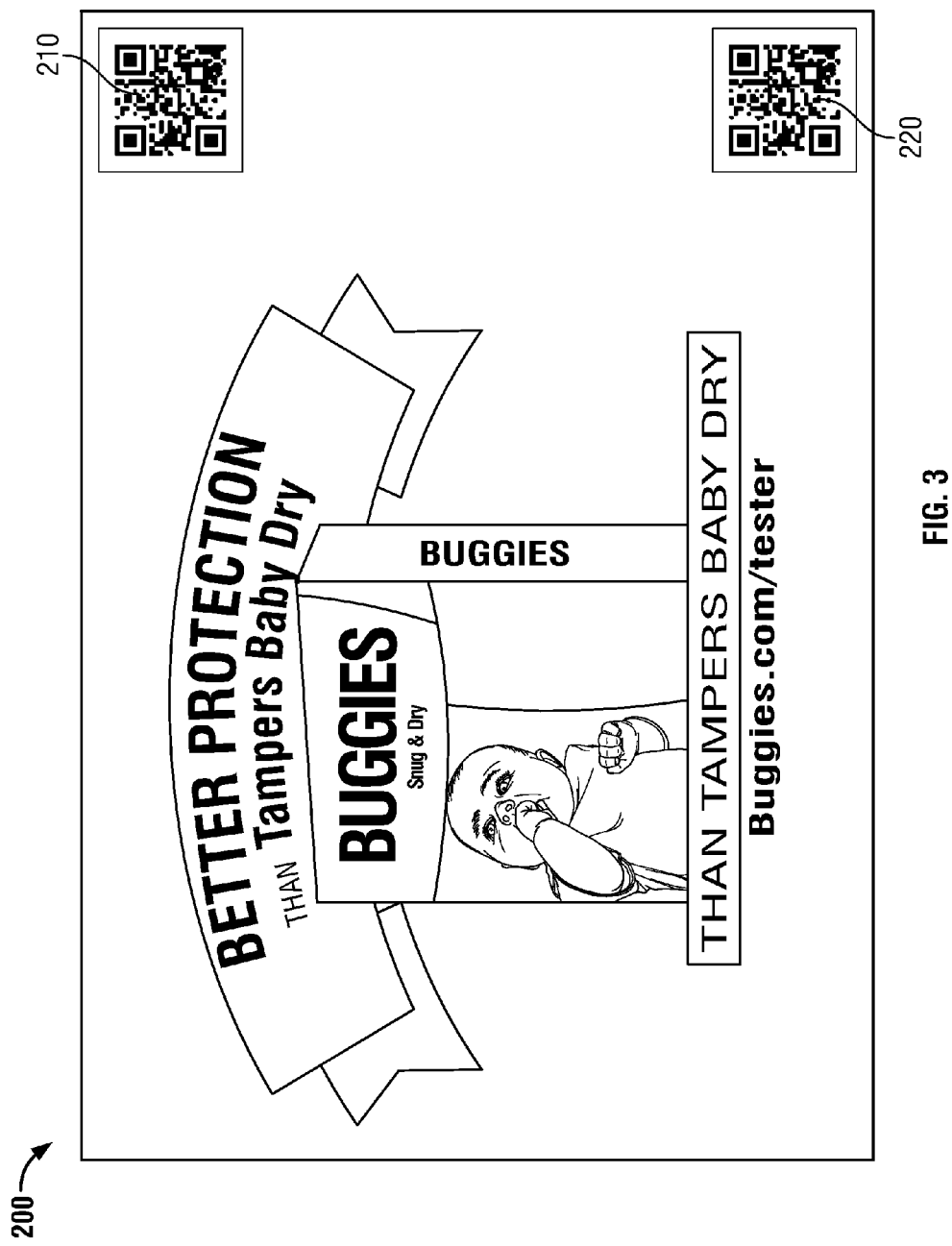
FIG. 3 shows the illustrative frame of video in FIG. 1 on which the test results have been inserted in a matrix code.

The test results may be made available to a user in any suitable manner. For example, as shown in FIG. 3, in some implementations the test results may be encoded in a matrix code 220 that is included in the video frame along with the matrix code 210 that includes the test parameters. Thus during a typical test, the test system issues a command or sequence of commands to the STB or other DUT. Each frame of video, including the matrix code associated therewith, is captured and made available to the test system for analysis to determine if the video rendering device is operating in a satisfactory manner.

The amount of data that may be stored on the matrix code, and thus the number of tests that may be specified, may vary depending on the nature of the matrix code and the quality of the video stream. For example, QR codes have a range of data capacities. Currently, a 'Version 1' QR code encodes the least number of data bits, and a 'Version 40' QR code encodes the maximum number of data bits (i.e., 1264 characters). The QR code version that is employed may depend at least in part on the resolution of the video stream. For instance, a high resolution stream such as a stream in a 1080i/p format may be able to support version 40 QR code, whereas a stream in a 720i/p format may only be able to support, say, a version 37 QR code. One advantage arising from the use of QR codes is that they incorporate error corrected capabilities, which can allow testing to be performed even if the video quality is relatively low. Of course, if the video quality is so poor that the QR code is unrecognizable, the test will fail.

Any of a wide variety of tests may be performed on the DUT. For example, some tests may be performed to access video quality. The quality of a frame may be determined according to any of a plurality of quality analysis metrics, including, for example, structural similarity (SSIM), visual quality model (VQM), mean-squared error (MSE), just noticeable difference (IND), peak signal-to-noise ratio (PSNR), row-column analysis, or the evaluation of total errors in a region and sub-region of the frame. The quality tests may also include, without limitation, an analysis of macroblocks and tiling and the identification of any frozen, blank or duplicate frames. Other tests that may be performed may include EAS tests, closed-captioning tests, trick play verification, lip synch verification (e.g., by converting audio to text or by using test tones such as DTMF tones), and audio.

In some instances, errors in individual frames may be acceptable such that they pass the test specified in the matrix codes. However, errors that may be individually acceptable may not be acceptable if they persist over multiple frames Accordingly, the matrix codes may include test parameters that allow the test system to additionally monitor and analyze errors across a sequence of frames to identify temporal errors.

The pass-fail limits included in the test parameters may include multiple quality metrics that are each compared to a metric specific threshold so that if the quality of a frame is below the threshold for any metric, the frame is determined to have failed the quality analysis. Similarly, the errors across multiple frames may be pooled, thus a sequence of frames may be evaluated for each quality metric.

In the examples described above the DUT is a video rendering device into which the video stream is directly input. In some embodiments, however, the video signal may be directed to the video rendering device from an external source such as the headend of a cable network (e.g., a hybrid fiber cable) or a satellite network, which generally include a number of intermediate systems and components before reaching the video rendering device. In this case any artifacts arising anywhere in the network and not just in the video rendering device can be detected.

Figure 4:
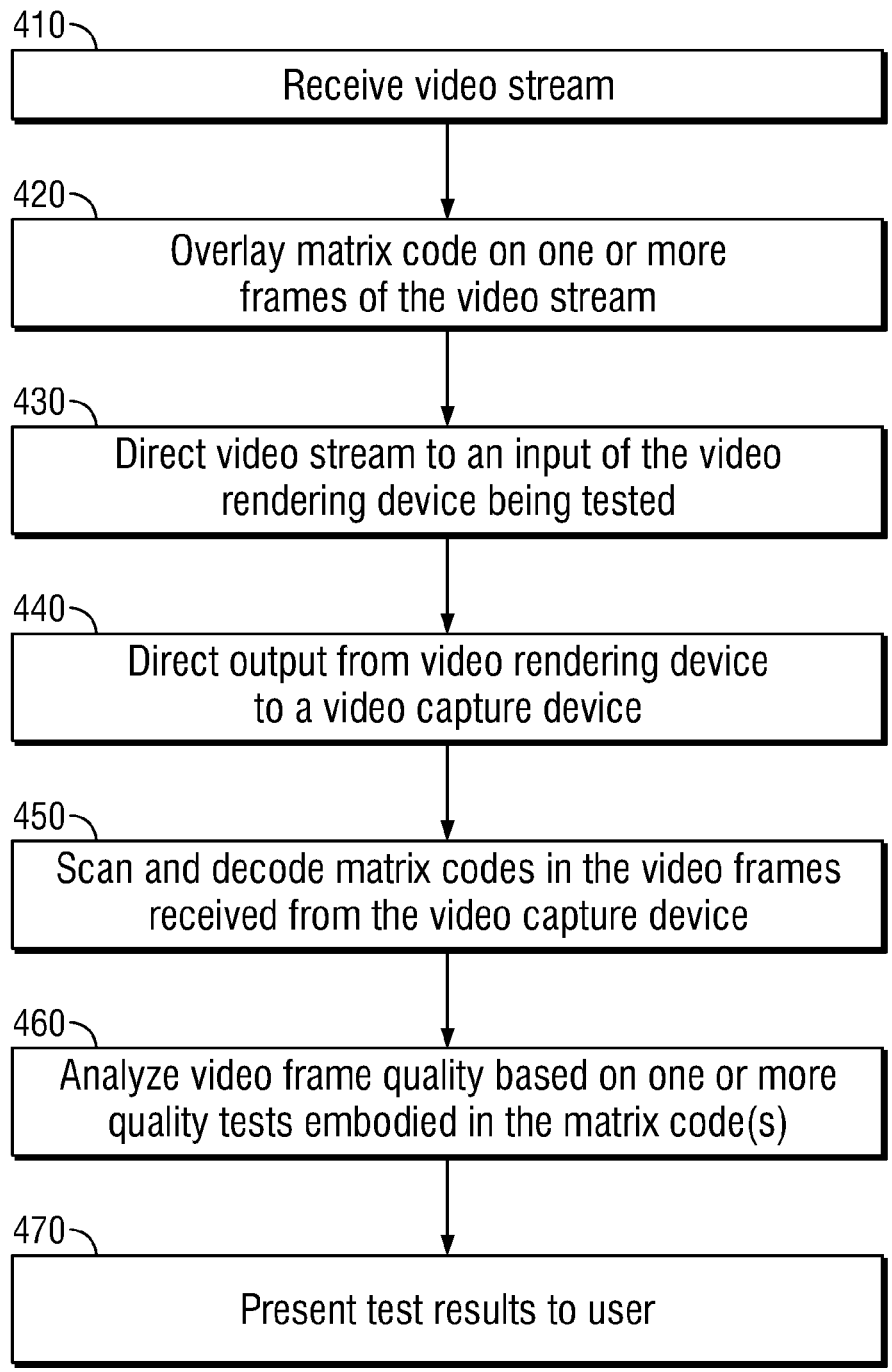

FIG. 4 is a flowchart showing one example of a method for testing a video rendering device such as a set top box or the like. The method begins by preparing a video stream or sequence that may be used as a test video. The content of the video stream may be specifically designed and tailored for purposes of testing or it may be any readily accessible video such as those that are available from a wide variety of content providers.

In particular, the method begins when the video stream or sequence that is to be used for testing purposes is received at step 410. At step 420 a matrix code is overlaid onto one or more of the frames of video. In some cases a matrix code is inserted into every frame of the video stream. The matrix code or codes encode one or more test parameters specifying one or more quality tests that are to be performed on the video frame or frames in which the matrix code is overlaid. The manner in which such a code is overlaid or otherwise inserted into the video stream is well known and need not be discussed in detail.

Next, at step 430 the video stream is directed to one of the inputs of a video rendering device that is to be tested. The video output from the video rendering device is directed to a video capture device at step 440, which in turn forwards the video to a matrix code decoding device to scan and decode the matrix code(s) overlaid on the frames at step 450. After the matrix code has been decoded, a video quality analyzer analyzes the quality of the video frame at step 460 based on the one or more quality tests embodied in the matrix code which have been decoded by the matrix code decoding device. The test results obtained by the video quality analyzer are presented to a user in a suitable format at step 470.

Aspects of the subject matter described herein are operational with numerous general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules or components, being executed by a computer. Generally, program modules or components include routines, programs, objects, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 5:
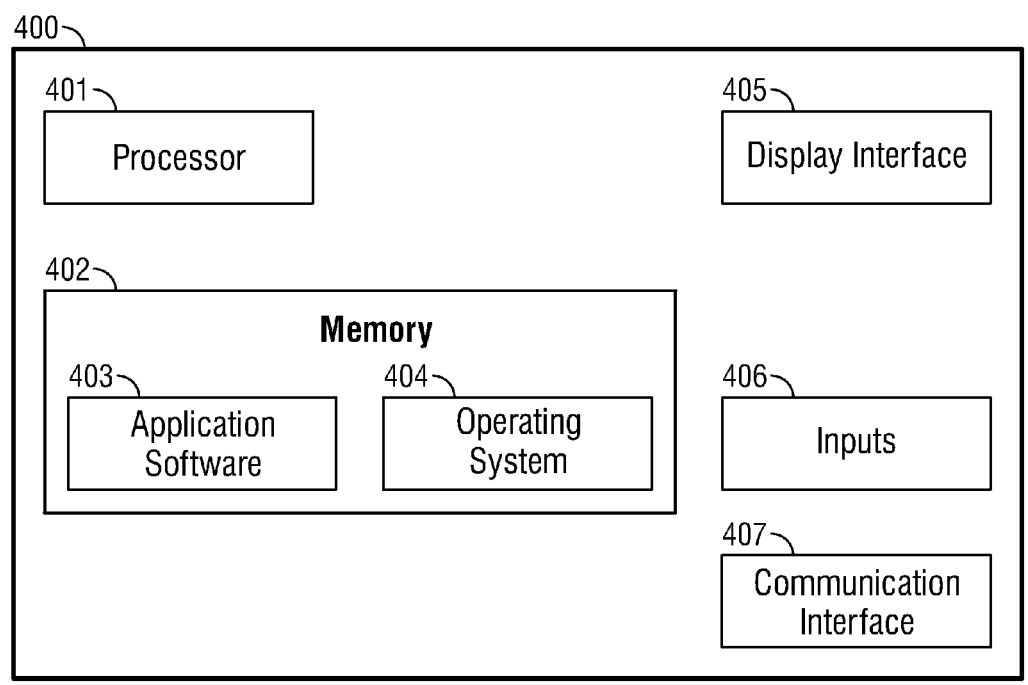
FIG. 5 illustrates various components of an illustrative computing-based device.

FIG. 5 illustrates various components of an illustrative computing-based device 400 which may be implemented as any form of a computing and/or electronic device, and in which embodiments of a DUT server and/or a test system as described above may be implemented.

The computing-based device 400 comprises one or more inputs 406 which are of any suitable type for receiving media content, Internet Protocol (IP) input, activity tags, activity state information, resources or other input. The device also comprises communication interface 407 to enable the device to communicate with one or more other entity using any suitable communications medium.

Computing-based device 400 also comprises one or more processors 401 which may be microprocessors, controllers or any other suitable type of processors for processing computing executable instructions to control the operation of the device in order to provide a search augmentation system. Platform software comprising an operating system 404 or any other suitable platform software may be provided at the computing-based device to enable application software 403 to be executed on the device.

The computer executable instructions may be provided using any computer-readable media, such as memory 402. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 405 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described are disclosed as example forms of implementing the claims.

The invention claimed is:

1. A computer-implemented method for evaluating video data, comprising:
   receiving a video stream from a video rendering device that includes a plurality of video frames, at least one of the video frames including a matrix code overlaid thereon,
      wherein the matrix code encoding one or more test parameters specifying one or more quality tests that are to be performed on the video frame on which the matrix code is overlaid, and
      wherein the one or more test parameters includes an identity of the video frame on which the matrix code is embedded so that quality tests identify the video frame on which the matrix code is overlaid;
   using a matrix code decoding device to scan and decode the matrix code; and
   analyzing the quality of the video frame based on the one or more quality tests embodied in the matrix code and decoded by the matrix code decoding device.

2. The computer-implemented method of claim 1, wherein the analysis of the quality of the video frame is performed on an entire sequence of video frames, including the video frame on which the matrix code is overlaid to identify macroblocks for analysis of the quality of the video frame.

3. The computer-implemented method of claim 1, wherein the matrix code is a QR code.

4. The computer-implemented method of claim 1, wherein each video frame of the video stream includes a single matrix code overlaid thereon.

5. The computer-implemented method of claim 4, wherein the matrix codes are overlaid at a common location on each of the respective video frames.

6. The computer-implemented method of claim 1, wherein the one or more testing parameters includes a specification of one or more tests to be performed on the video frame, the one or more tests being selected from the group consisting of EAS tests, closed-captioning tests, trick play verification tests and lip synch verification tests.

7. The computer-implemented method of claim 1, wherein the one or more testing parameters includes a specification of one or more tests to be performed on the video frame, the one or more tests including an analysis of macroblocks and tiling and an identification of any frozen, blank or duplicate frames.

8. The computer-implemented method of claim 1, wherein the video rendering device is selected from the group consisting of set-top boxes, video cards, display cards, portable multimedia devices, video players, digital video recorders and gaming devices.

9. The computer-implemented method of claim 1, further comprising providing the test parameters decoded by the matrix code decoding device to a video test analyzer device that performs the analysis.

10. The computer-implemented method of claim 1, further comprising providing results of the one or more quality tests in a second matrix code that is overlaid on the video frame.

11. A test system for analyzing a video frame from a device under test, the test system comprising:
    a video capture device for receiving a video stream from a video rendering device that includes a plurality of video frames, at least one of the video frames including a matrix code overlaid thereon,
        wherein the matrix code encodes one or more test parameters specifying one or more quality tests that are to be performed on the video frame on which the matrix code is overlaid, and
        wherein the one or more test parameters includes an identity of the video frame on which the matrix code is embedded so that quality tests identify the video frame on which the matrix code is overlaid;
    a matrix code reader for scanning and decoding the matrix code; and
    a video quality analyzer for analyzing the quality of the video frame based on the one or more quality tests embodied in the matrix code and decoded by the matrix code decoding device.

12. The test system of claim 11, wherein the analysis of the quality of the video frame is performed on an entire sequence of video frames, including of the video frame on which the matrix code is overlaid to identify macroblocks for analysis of the quality of the video frame.

13. The test system of claim 11, wherein the matrix code is a QR code.

14. The test system of claim 11, wherein the video rendering device selected from the group consisting of set-top boxes, video cards, display cards, portable multimedia devices, video players, digital video recorders and gaming devices.

15. The test system of claim 11, wherein the video quality analyzer is further configured to provide results of the one or more quality tests in a second matrix code that is overlaid on the video frame.

* * * * *